March 9, 1943.　　　　　S. ALSOP　　　　　2,313,612
FILTER
Filed Oct. 24, 1939　　　2 Sheets-Sheet 1

INVENTOR
Samuel Alsop
BY
ATTORNEY

March 9, 1943. S. ALSOP 2,313,612
FILTER
Filed Oct. 24, 1939 2 Sheets-Sheet 2
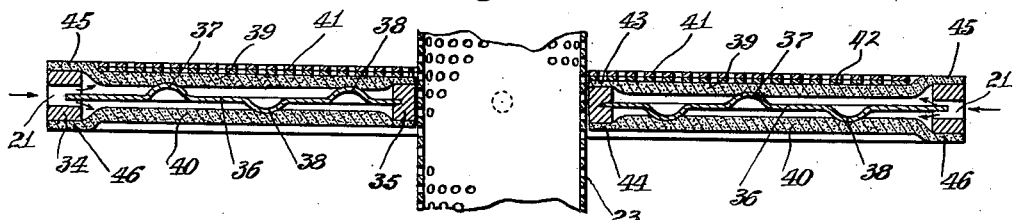
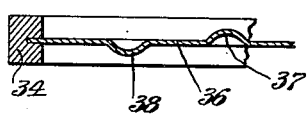
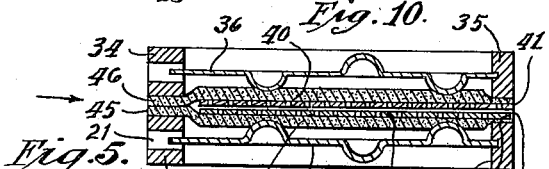
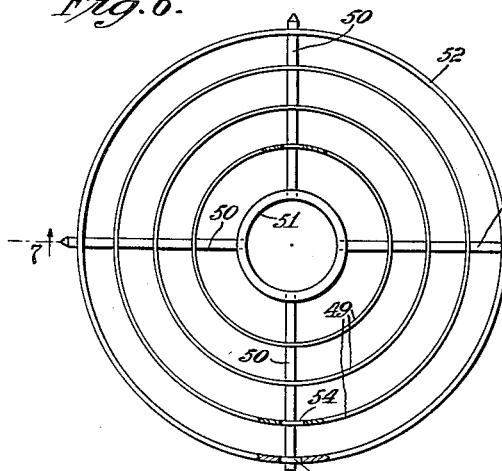
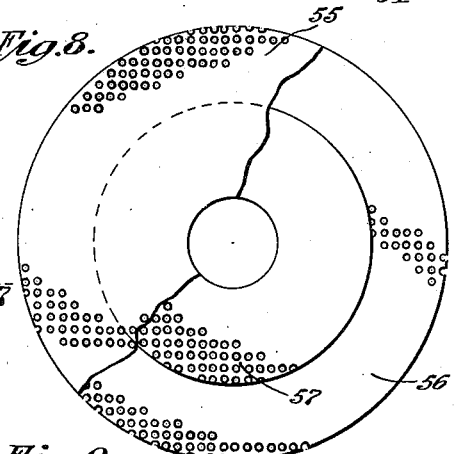
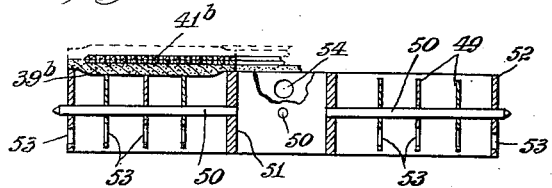
INVENTOR
Samuel Alsop
BY
ATTORNEY Patented Mar. 9, 1943

2,313,612

UNITED STATES PATENT OFFICE 2,313,612

FILTER

Samuel Alsop, Milldale, Conn.

Application October 24, 1939, Serial No. 300,918

5 Claims. (Cl. 210—179)

This invention relates to filters and has for its object to provide a simple, compact and inexpensive device of this sort in which the fluid to be filtered is supplied to one face and an edge and drawn off from the opposite face and edge of each of a number of stacked filter pads.

Referring to the drawings,

Fig. 3 shows the detail of one supporting means for a pair of spaced filter pads.

Fig. 4 is a section of a pad spacing and supporting unit on the line 4—4 of Fig. 2.

Fig. 5 is a section through a modified form of filter pad spacing and supporting unit.

Fig. 6 shows another type supporting means and spacing means for filter pads.

Fig. 7 is a section on the line 7—7 of Fig. 6.

Fig. 8 shows a modified type perforate plate combination adapted for use with the pad supporting and spacing means shown herein.

Fig. 9 is a side or edge view of the construction shown in Fig. 8.

Fig. 10 is a sectional view showing filter pads with an exaggerated spacing between perforated plates 41, 42.

Figures 1, 2:
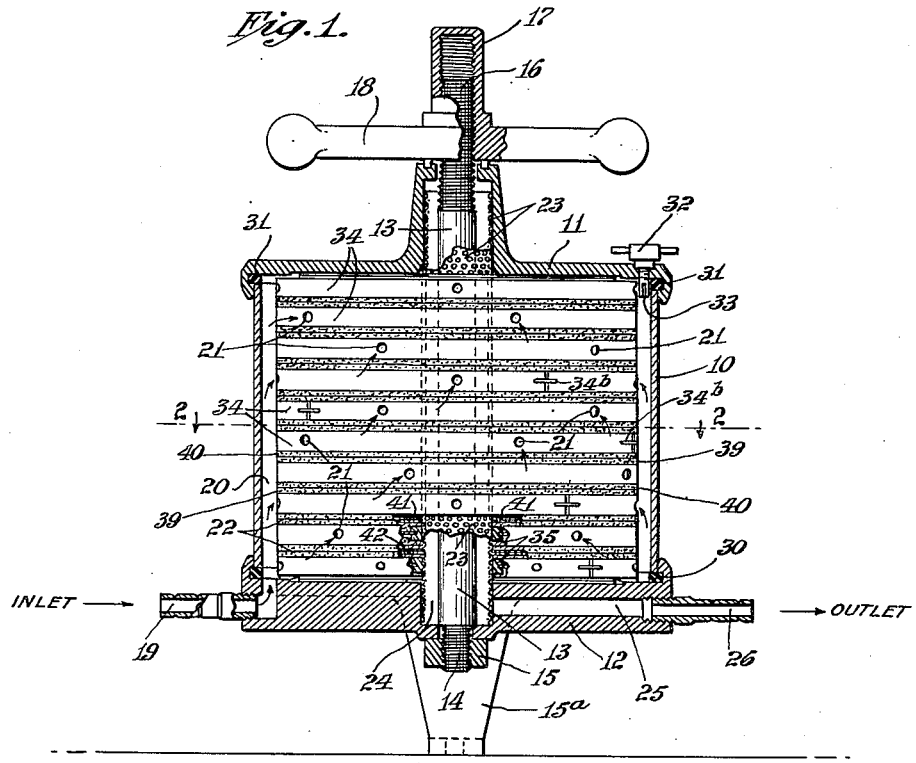
Fig. 1 shows a longitudinal section through one embodiment of this invention.
Fig. 2 is a section on the line 2—2 of Fig. 1.

An outer casing 10 shown in the embodiment illustrated as being of cylindrical shape is provided with a cover 11 and a base portion 12. A bolt 13 has threads 14 at its lower end engaging a nut 15 on the underside of the base 12, the base being raised by the supporting legs 15a illustrated. The upper end of the bolt 13 is also provided with threads 16 for cooperation with a nut 17 of the general shape indicated and having arms 18 by means of which substantial force may be applied to compress the filter stack and tightly hold the cover and base against the ends of the casing 10.

The inlet pipe 19 leads to a space 20 surrounding the filter stack; holes 21 in the spacing means for filter pads provide a number of paths for the fluid to be filtered. As shown more clearly in Figs. 3 and 5, the fluid to be filtered passes through the holes 21 and thence through the filter pads 22 after which the filtered fluid passes through the perforate cylinder 23 to the radially inner passage 24 around the bolt 13 and thence through the outlet passage 25 and outlet pipe 26. At the bottom of the space 20 is located a drain opening 27 leading to the drain pipe 28 controlled by a valve 29 which normally holds the drain closed but may be opened to allow drawing off of sediment or other filtered impurities through the drain opening. Between the base 12 and the casing 10 is a gasket or packing strip 30, a similar strip 31 being located between the cover 11 and the casing 10. Over the space 20 is a threaded hole receiving a vent valve 32 which when closed seals the inside of the casing from the outside. In event any gas collects in the upper portion of the casing 10 it is only necessary to open vent valve 32 to allow its escape. The lower end portion of the vent valve 32 is bifurcated at 33 and the bifurcated ends spread enough to prevent the vent valve being pulled out after the threads have been released.

In Fig. 3 is shown a detail of one form of the filter pad spacing and supporting units. Each such unit includes a peripheral member 34 which is a split ring grooved on the inside to receive the plate 36.

Having the ring 34 split enables it to be expanded to facilitate reception of the plate 36 and after the plate is in position the split ends of the ring may be fastened by the bent wire 34b shown in Fig. 2. Radially spaced from the peripheral member 34 is an inner member 35 grooved on the outside to receive the plate 36 as illustrated. Each plate or disc 36 is provided with a number of projections or recesses 37 and 38 for the purpose of spacing the pads of filter material 39 and 40 to provide room on each side of the disc 36 for the fluid to be filtered, such fluid being directly contiguous each of the filter pads for a large portion of its area. The projections prevent the pads from sagging when wet. Contiguous the opposite face of each filter pad are screens or perforate plates 41 and 42 or plates of porous materials with sufficient space 40x between them to allow horizontal passage of the filtered liquid. The means for spacing these screens from each other is immaterial so long as there is enough space to permit the filtered liquid to pass horizontally to the perforated tube cylinder 23. These plates or liquid outlet spacers are thin enough to conform to the surface of the filter pads. The fluid after passing through each filter pad moves along the perforated plates radially inwardly through the space between the plates and thence through the grooved screen or porous guide bushing 23 about which the units and pads are stacked, and thence into the space 24 and out of the passages 25 and 26. Each pad of filter material is compressed at 43, 44, 45 and 46 considerably more contiguous the members 35 and 34 than these pads are compressed between them with the result that these more heavily compressed portions function as gaskets to seal the inlet and outlet side of each filter pad against fluid bypassing the filter. This heavier compression need not be initially placed upon the filter pads but may be due entirely to the pressure exerted by the clamping nut 17 upon the top of the filter stack through the cover 11. The pairs of liquid outlet spacers 41 and 42 preferably do not extend over the peripheral member 34 but do extend over the inner member 35 and for this reason the member 34 should be thicker than the member 35 in a direction axially of the filter casing. The inner member 35 need not be split and when this is the case the groove in its outer surface for reception of the plate 36 is preferably of much less depth than is shown in Fig. 3 in order that the plate 36 may be received therein without excessive deformation.

In Fig. 5 is shown a modified form of unit for supporting and spacing a pair of filter pads to provide a larger space between the pads than is provided in the embodiment shown in Fig. 3. The outer member 34a is provided with the usual openings 21a through which the fluid to be filtered may enter. The inner member 35a is preferably provided with two grooves spaced as illustrated for reception of the perforate plates 47 and 48, these plates being bent over the outer member 34a as shown in Fig. 5 so that when finished the unit constitutes a perforate metal cage, except for the inner member 35a which, of course, is not perforate. A pad of filter material is placed contiguous the outer face of each disc 47 and 48 and upon each pad is a pair of perforate plates similar to those designated in Fig. 3 by the numerals 41 and 42. These spacing units of Fig. 5 take up much more room longitudinally and therefore provide less filter pads for a given length of casing.

Where the liquid to be filtered contains rather coarse particles of solid matter to be filtered out, such as charcoal or the like, the embodiment shown in Fig. 5 will be found useful as the inside of the cage may be cleaned more easily than is the case with the embodiment shown in Fig. 3. It will be understood the pads are stacked and compressed in the same way with the embodiment shown in Fig. 5 that they are in Fig. 3, except for the fact that fewer pads are used.

Among the advantages of this invention may be mentioned the ease with which the entire filter stack is made accessible or any part thereof accessible for renewal or repair. The pads of filter material are preferably flexible fibrous material which, were it not for the supports provided on each face, might be in danger of becoming distorted with substantially unbalanced pressure on either the supply or outlet sides of the filter. The compressed inner and outer edges of these pads function as gaskets without the necessity of separate packing strips being provided. The casing is sealed between the inside and outside and also within it between the supply and outlet passages. The drain pipe and valve enable the filter to be cleaned to some extent without the necessity of opening it. While the embodiments illustrated have been described as having the outlet connected to the radially outer part of the filter stack and the inlet within the stack, it will be understood that conditions might well be reversed. However the embodiment illustrated is preferred since the inlet connection to the radially outer space 20 provides a much larger area in which impurities may be given an opportunity to precipitate than would be the case if the radially inner passage were the inlet. The embodiment shown in Fig. 3 is a simple and inexpensive yet effective manner of spacing and supporting the filter pads.

The pad supporting and spacing means shown in Fig. 6 allows a large space in which dirt or other solid matter to be removed, may collect. This is easier to clean than the construction shown in Fig. 5, but is not adapted to withstand as heavy back pressure as is the Fig. 5 construction. It is simple and inexpensive to construct, comprising a number of concentric rings 49, held together by the rods 50 on which they have a tight friction fit or are otherwise suitably secured. The iner ring 51 and the outer ring 52 are shown as being heavier than the intermediate rings and these rings 51 and 52 are also deeper as shown in Fig. 7. Holes 53 allow the liquid supply to circulate between each pair of rings. Another set of holes 54 are located adjacent the opposite edge of the rings. The provision of two sets of holes allows for better drainage of liquid from between the filter pads regardless of which edge of the rings is uppermost. The conical outer ends to the rods 50, may or may not aid in locating the spacers within the casing 10. As shown in Fig. 7 the plates 41b function as do the outlet plates 41 in Fig. 3, the outer edge of these plates terminating within the outer edge of the pads to prevent leakage or by-pass of liquid around the pads, as might occur if the plates extended to the outer edge of the pads.

The liquid outlet plates 55 and 56 shown in Fig. 8 function as do those shown in Fig. 3. Structurally they are different by reason of having a spacer plate 57 between the plates 55 and 56 as illustrated in Fig. 9. These liquid outlet spacer plates are permanently held together in any convenient manner, by spot welding in two spaced portions or otherwise. There is of course sufficient space between the plates 55 and 56 and through the spacer plate 57 to permit the flow of liquid from the outer to the inner edge.

I claim:

1. A filter comprising a casing having top and bottom plates and having an inlet and an outlet, a central perforated tube communicating with the outlet, a filter stack mounted on said perforated tube and comprising a number of coaxial plates, each of said plates having an inner ring and an outer ring with spaces above and below each plate between the inner and outer rings thereof, each outer ring having passages communicating with the spaces above and below said plate, a pair of annular filtering pads arranged between each of two adjacent plates and having the inner and outer edges of the pads clamped between the rings thereof, a spacing member having horizontal passages arranged between each of two pads of a pair permitting liquid to pass through the pads to the central perforated tube, and means extending through said tubular member for drawing said top and bottom plates toward each other and compressing the parts of the stack together.

2. A filter comprising a casing having an inlet and an outlet, a stack of filtering units in said casing and spaced therefrom to provide a passage communicating with said inlet; said stack having an axial passage communicating with the outlet and having a series of spaced horizontally arranged openings in its periphery; a pair of filtering units interposed between each series of peripheral openings and the axial passage; horizontally disposed rings for spacing the individual pads of each pair of pads to permit fluid to pass through said space and axially through the pads for filtering the fluid; and separate means for carrying the filtered fluid from the pads to the axial passage including a pair of contiguous meshed discs covering substantially one surface of each pad and extending inwardly to the axial passage.

3. A filter comprising a casing having an inlet and an outlet, a stack of filtering units in said casing and being spaced therefrom to provide a passage communicating with said inlet, said stack having an axial passage communicating with said outlet and having a series of spaced horizontally arranged openings in its periphery, a pair of filtering pads interposed between each series of peripheral openings and the axial passage, means for spacing the individual pads of each pair of pads to permit fluid to pass through said space and axially through the pads for filtering the fluid, means for carrying the filtered fluid from the pads to the axial passage, and means for preventing sagging of the individual pads of each pair including a plate interposed between the individual pads of each pair and having projections engaging the adjacent surfaces of said individual pads.

4. A filter comprising a casing having an inlet and an outlet, a bodily movable cover therefor, a stack of filtering units in said casing and being spaced therefrom to provide a passage communicating with said inlet, said stack having an axial passage communicating with said outlet and having a series of spaced horizontally arranged openings in its periphery, a pair of filtering pads interposed between each series of peripheral openings and the axial passage, means for spacing the individual pads of each pair of pads to permit fluid to pass through said space and axially through the pads for filtering the fluid including a ring member at the outer edges of the pads, means for carrying the filtered fluid from the pads to the axial passage and means for compressing the outer peripheral edges of the pads to prevent leakage at said edges including an elongated stem extending through the above said axial passage and a travelling nut on the stem adapted to engage the cover on its travel and force the cover against the stack of pads whereby the outer peripheral edges of the pads are pressed against the spacing ring member.

5. A filter comprising a casing having an inlet and an outlet, a stack of filtering units in said casing and spaced therefrom to provide a passage communicating with said inlet, said stack having an axial passage communicating with said outlet and having a series of spaced horizontally arranged openings in its periphery, a pair of filtering pads interposed between each series of peripheral openings and the axial passage, a ring member interposed between the individual pads of each pair at their outer and inner peripheries for spacing the individual pads to provide a passage for the fluid through the pads for filtering said fluid, and means for carrying the filtered fluid from the pads to the axial passage and outlet including a pair of meshed discs covering substantially one surface of each pad, the individual discs of each pair being spaced from each other to provide a passage communicating with the axial passage and means for preventing sagging of the individual spaced pads including a plate interposed between the individual pads of each pair and provided with projections engaging the adjacent surfaces of the individual pads.

SAMUEL ALSOP.